US012508673B2

(12) United States Patent  
Magg et al.

(10) Patent No.: US 12,508,673 B2  
(45) Date of Patent: Dec. 30, 2025

(54) DETERMINING AND REGULATING A FOCAL POSITION OF A PROCESSING BEAM

(71) Applicant: TRUMPF Werkzeugmaschinen GmbH + Co. KG, Ditzingen (DE)

(72) Inventors: Winfried Magg, Ditzingen (DE); David Schindhelm, Stuttgart (DE); Boris Regaard, Gerlingen (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 256 days.

(21) Appl. No.: 16/381,059

(22) Filed: Apr. 11, 2019

(65) Prior Publication Data

US 2019/0232434 A1 Aug. 1, 2019

Related U.S. Application Data

(63) Continuation of application No. PCT/EP2017/075795, filed on Oct. 10, 2017.

(30) Foreign Application Priority Data

Oct. 13, 2016 (DE) .......................... 102016219928.5

(51) Int. Cl.
*B23K 26/38* (2014.01)
*B23K 26/03* (2006.01)
(Continued)

(52) U.S. Cl.
CPC ............ *B23K 26/38* (2013.01); *B23K 26/032* (2013.01); *B23K 26/046* (2013.01); *B23K 26/0643* (2013.01); *B23K 26/0648* (2013.01)

(58) Field of Classification Search
CPC .... B23K 26/38; B23K 26/032; B23K 26/046; B23K 26/0643; B23K 26/0648
(Continued)

(56) References Cited

U.S. PATENT DOCUMENTS 4,472,055 A * 9/1984 Tsutsumi ........... B23K 26/0853  
356/123  
5,589,090 A * 12/1996 Song ....................... B27M 1/06  
219/121.75  
(Continued)

FOREIGN PATENT DOCUMENTS

CN 1590007 3/2005  
CN 1703298 11/2005  
(Continued)

OTHER PUBLICATIONS

Machine English Translation of DE-102009050784-A1 (Year: 2011).*  
(Continued)

*Primary Examiner* — Edward F Landrum  
*Assistant Examiner* — Erwin J Wunderlich  
(74) *Attorney, Agent, or Firm* — Fish & Richardson P.C.

(57) ABSTRACT

The invention relates to a method for determining a focal position of a machining beam, in particular a laser beam, relative to a workpiece when machining the workpiece using the machining beam, having the following steps: receiving at least one spatially resolved image of a workpiece region to be monitored, said region comprising the cut edges of a cut gap formed during the machining process on the upper face of the workpiece, ascertaining a gap width of the cut gap on the upper face of the workpiece using the cut edges in the at least one spatially resolved image, and determining the focal position of the machining beam relative to the workpiece using the ascertained gap width. The invention also relates to a corresponding device.

8 Claims, 2 Drawing Sheets

(51) Int. Cl.
B23K 26/046 (2014.01)
B23K 26/06 (2014.01)

(58) Field of Classification Search
USPC .................................................. 219/121.72
See application file for complete search history.

(56) References Cited

U.S. PATENT DOCUMENTS

| | | | | |
|---|---|---|---|---|
| 5,936,717 | A * | 8/1999 | Viola .................... | B41J 2/475 356/72 |
| 6,646,728 | B1 * | 11/2003 | Tang .................... | B23K 26/705 356/123 |
| 6,791,057 | B1 | 9/2004 | Kratzsch et al. | |
| 8,304,691 | B2 * | 11/2012 | Scholich-Tessmann .................... | B23K 26/04 219/121.83 |
| 8,379,194 | B2 * | 2/2013 | Geisel ................ | B23K 26/046 356/123 |
| 8,410,395 | B2 * | 4/2013 | Mienhardt .......... | B23K 26/046 219/121.72 |
| 8,957,347 | B2 * | 2/2015 | Yoshikawa ......... | H01L 21/3043 219/121.62 |
| 10,058,953 | B2 | 8/2018 | Hesse et al. | |
| 11,065,721 | B2 * | 7/2021 | Blaschka ............ | G01B 11/028 |
| 2005/0045090 | A1 | 3/2005 | Ikegami et al. | |
| 2006/0138111 | A1 * | 6/2006 | Hillebrand .......... | B23K 26/04 219/121.83 |
| 2008/0180657 | A1 * | 7/2008 | Scholich-Tessmann .................... | B23K 26/04 356/123 |
| 2010/0200552 | A1 * | 8/2010 | Mienhardt ........... | B23K 26/38 219/121.72 |
| 2013/0068738 | A1 * | 3/2013 | Schurmann .......... | B23K 26/03 219/121.72 |
| 2013/0082038 | A1 * | 4/2013 | Yoshikawa ......... | B23K 26/0006 219/121.81 |
| 2013/0146573 | A1 * | 6/2013 | Hamaguchi ......... | B23K 26/046 219/121.72 |
| 2013/0319980 | A1 * | 12/2013 | Hesse .................... | B23K 26/38 219/121.62 |
| 2016/0114434 | A1 * | 4/2016 | Regaard .............. | B23K 26/046 219/121.85 |
| 2019/0111516 | A1 * | 4/2019 | Meyer ................. | B23K 26/0861 |
| 2021/0039197 | A1 * | 2/2021 | Yoshikawa .......... | B23K 26/53 |
| 2021/0114136 | A1 * | 4/2021 | Luedi ................... | G02B 27/141 |

FOREIGN PATENT DOCUMENTS

| | | | | |
|---|---|---|---|---|
| CN | 102905841 | | 1/2013 | |
| CN | 104002039 | | 8/2014 | ............ B23K 26/046 |
| CN | 104271307 | | 1/2015 | |
| CN | 105246636 | | 1/2016 | |
| DE | 198 52 302 | | 5/2000 | ............. B23K 26/04 |
| DE | 102 55 628 | | 7/2004 | ............. B23K 26/04 |
| DE | 10329744 | A1 * | 9/2004 | ............. B23K 26/04 |
| DE | 102009050784 | | 5/2011 | ............. B23K 26/03 |
| DE | 102009050784 | A1 * | 5/2011 | ............. B23K 26/24 |
| DE | 102010020183 | | 11/2011 | ............. B23K 26/03 |
| DE | 102011003717 | | 8/2012 | ............. B23K 26/03 |
| DE | 102012100721 | | 4/2013 | ............. B23K 26/04 |
| DE | 102012100721 | B3 * | 4/2013 | ........... B23K 26/032 |
| DE | 102013210078 | | 12/2014 | ........... B23K 26/046 |
| DE | 102014000330 | | 3/2015 | ............. B23K 26/04 |
| DE | 102014000330 | B3 * | 3/2015 | ........... B23K 26/032 |
| EP | 1 750 891 | | 2/2007 | ............. B23K 26/04 |
| JP | S 62-183990 | | 8/1987 | ............. B23K 26/02 |
| JP | 2637523 | B2 * | 8/1997 | |
| JP | H 10-258382 | | 9/1998 | ............. B23K 26/04 |
| JP | H10258382 | A * | 9/1998 | ............. B23K 26/04 |
| JP | 4583955 | B2 * | 11/2010 | |
| JP | 6000551 | B2 * | 9/2016 | |
| WO | WO 2004/050290 | | 6/2004 | ............. B23K 26/04 |
| WO | WO 2013/113479 | | 8/2013 | ............. B23K 26/04 |
| WO | WO-2013110467 | A1 * | 8/2013 | ........... B23K 26/032 |
| WO | WO 2015/106775 | | 7/2015 | |
| WO | WO-2015117979 | A1 * | 8/2015 | ............... G06T 7/11 |

OTHER PUBLICATIONS

Machine English Translation of WO-2013110467-A1 (Year: 2013).*
Machine English Translation of WO-2015117979-A1 (Year: 2015).*
Machine English Translation of DE-102014000330-B3 (Year: 2015).*
Machine English Translation of JP-H10258382-A (Year: 1998).*
Machine English Translation of DE-10329744-A1 (Year: 2004).*
Machine English Translation of JP-4583955-B2 (Year: 2010).*
Machine English Translation of JP-6000551-B2 (Year: 2016).*
Machine English Translation of JP-2637523-B2 (Year: 1997).*
Machine English Translation of DE-102012100721-B3 (Year: 2003).*
CN Office Action in Chinese Appln. 201780063334.5, dated Sep. 1, 2020, 11 pages (partial English translation).
German Office Action for German Application No. DE 10 2016 219 928.5 dated Jun. 27, 2017.
German Search Report for German Application No. DE 10 2016 219 928.5 b dated Jun. 22, 2017.
International Search Report for International Application No. PCT/EP2017/075795 dated Feb. 19, 2018.
International Preliminary Report on Patentability for International Application No. PCT/EP2017/075795 dated Apr. 16, 2019.
Database WPI Week 2017 Clarivate Analytics, XP-002777992.
Thombansen, U. et al. "Setup and Maintenance of Manufacturing Quality in CO2 Laser Cutting" 2nd International Conference on Ramp-Up Management 2014 (ICRM); pp. 98-102; 2014 Elsevier B.V.†
Full German-language dissertation by Molitor, T. titled "Process diagnostics of dynamic melts for controlling laser cutting processes"; Published on the publication server of RWTH Aachen University, Germany; 2015; Evidence of publication is highlighted on the first page of the attached PDF document.†
Excerpt of the dissertation by Molitor, T., "Process diagnostics of dynamic melts for controlling laser cutting processes"; Published on the publication server of RWTH Aachen University, Germany; 2015; pp. 49-55, 68-74, 81-93; German-language excerpt and Certified English translation of the same are provided.†

* cited by examiner
† cited by third party

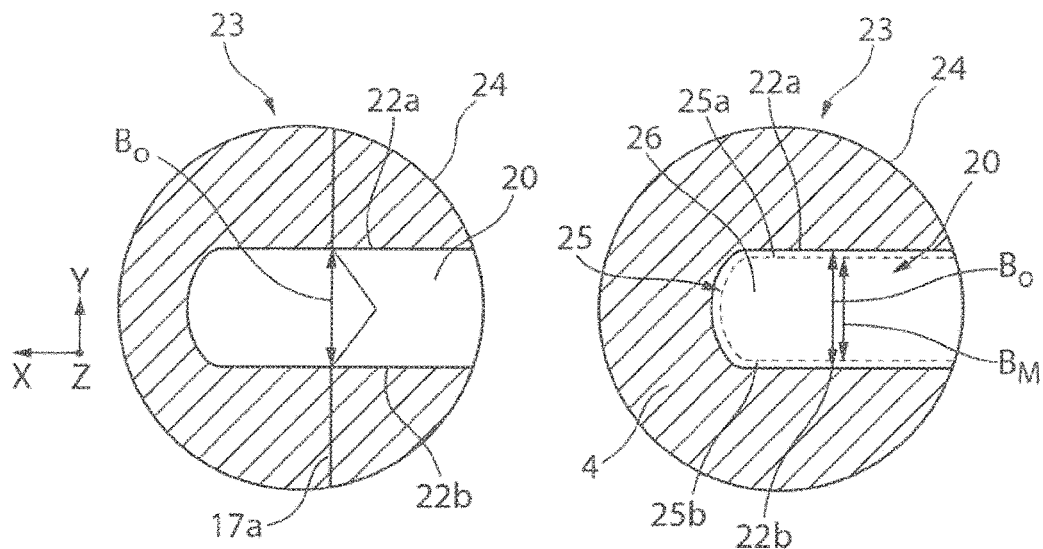
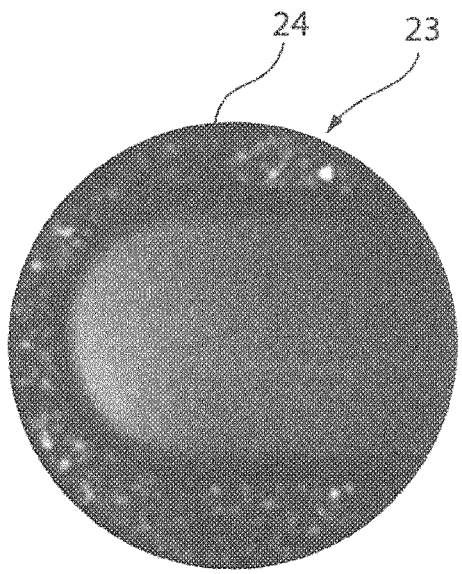
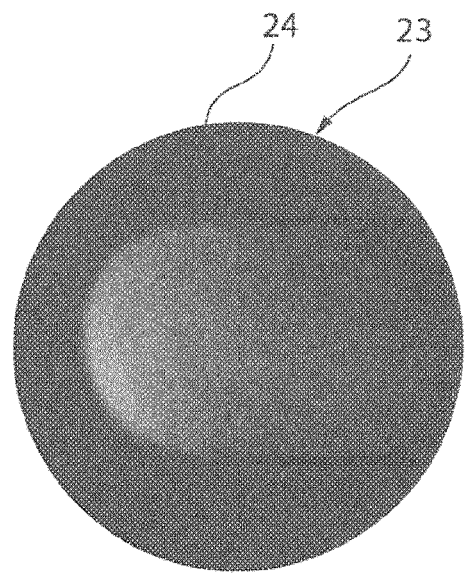
Fig. 3  Fig. 4
Fig. 5  Fig. 6

DETERMINING AND REGULATING A FOCAL POSITION OF A PROCESSING BEAM

CROSS REFERENCE TO RELATED APPLICATIONS

This application is a continuation of and claims priority under 35 U.S.C. § 120 from PCT Application No. PCT/EP2017/075795, filed on Oct. 10, 2017, which claims priority from German Application No. 10 2016 219 928.5, filed on Oct. 13, 2016. The entire contents of each of these priority applications are incorporated herein by reference.

TECHNICAL FIELD

The present invention relates to determining a focal position of a processing beam and regulating a focal position of a processing beam.

BACKGROUND

For a robust cutting process, the focal position in the beam propagation direction (i.e., in the direction of the beam axis) of the (focused) processing beam, for example, a laser beam, is a significant process characteristic. The waist of the beam, i.e., the minimum extent and/or the minimum diameter of the (focused) processing beam perpendicular to the beam axis, is located at the focal position. The processing beam is typically emitted at a right angle to a plate-type workpiece (in Z direction), for example, in the present applications, i.e., its beam axis is aligned perpendicular to the surface of the workpiece (in the XY plane). It is difficult to directly measure the focal position, which is influenced by disturbance variables. The focal position is therefore typically kept constant by regulating the influencing parameters (e.g., focal position and cutting distance).

DE 10 2014 000 330 B3 discloses a method for monitoring and regulating the focal position of a processing laser beam during laser cutting. In this method, a process emission caused by the laser processing and a cutting front advancing in the workpiece are detected with spatial resolution with at least one imaging camera in one or more images during the laser processing. The instantaneous focal position of the processing laser beam relative to the surface of the workpiece is then determined from the instantaneous extent of the process emissions and the instantaneous distance of a location of maximum process emissions from the topmost cutting front apex in the one or more images.

EP 1 750 891 B1 discloses a method for determining the focal position of a laser beam of a laser system suitable for a workpiece processing operation, in which at least two different focal positions are set. In this method, there is a determination of whether and, if so, under which circumstances, at least the boundary area of the laser beam comes in contact with a workpiece in different focal positions of the laser beam.

SUMMARY

The present invention relates to a method and apparatus for determining a focal position of a processing beam (e.g., a laser beam) and regulating a focal position of a processing beam relative to a workpiece during processing, by cutting the workpiece with the processing beam. The invention also relates to a respective apparatus for processing a workpiece by cutting by means of a processing beam, in particular by means of a laser beam.

One object of the invention is to provide a method and an apparatus that enable a determination and optional regulation of the focal position of a processing beam during the processing of a workpiece by cutting.

This object is achieved according to the invention by a method comprising the following steps: recording at least one spatially resolved image of an area of the workpiece that is to be monitored and comprises the cut edges of a cutting gap formed at the top side of the workpiece during processing by cutting, determining a gap width of the cutting gap at the surface of the workpiece on the basis of the cut edges in the at least one spatially resolved image, as well as determining the focal position of the processing beam in relation to the workpiece on the basis of the gap width determined.

In fusion cutting processes in particular (but not necessarily exclusively), the cutting gap width is determined and/or is influenced essentially by the width of the processing beam at the surface of the workpiece, for example, a plasma beam or a laser beam, i.e., through the caustic characteristics of the beam and the position of the beam waist (focus position in Z direction). With knowledge of the caustic characteristics of the processing beam, i.e., the change in diameter of the focused processing beam perpendicular to the beam axis in an ideal state, i.e., at a (nominal) focal position at which a good cutting result is achieved, it is possible to ascertain the focal position in Z direction and/or the position of the beam waist by determining the width of the cutting gap at the surface of the workpiece. In doing so, it is possible to make use of the fact that the course of the cutting gap in the thickness direction corresponds practically to the caustic characteristics of the processing beam at comparatively low feed rates during processing by cutting. At higher feed rates, there may be minor deviations between the course of the cutting gap in the thickness direction and the caustic characteristics of the processing beam, in which case the gap width of the cutting gap will typically decrease slightly at the top side of the workpiece, and the gap width of the cutting gap will increase slightly on the bottom side of the workpiece. Although this effect is relatively small, this effect may be taken into account in determining the focal position by correcting the focal position as a function of the feed rate (only at high feed rates).

In determining the focal position, it is possible to make use of the fact that the caustic characteristics of the processing beam decrease monotonically up to the focal position and then increase monotonically. For example, if it is known that the focal position and/or the beam waist is/are situated beneath the surface of the workpiece, then there is a unique correlation between the gap width at the top side of the workpiece and the Z position along the caustic characteristics of the beam, on the basis of which the focal position can be determined. Likewise, if the position of the beam waist is known and/or if the focal position in Z direction is known, it is possible to infer the caustic characteristics of the beam (or the numerical aperture of the laser beam). However, this measured variable is usually of only subordinate importance in practice.

The method described here makes it possible to determine and/or verify and regulate, if necessary (see below), the correct focal position, i.e., the correct position of the beam waist relative to the workpiece during processing by cutting, i.e., online and/or during production. As is common practice, a cutting gap is formed in the workpiece during processing by cutting, the gap running along a curve with a predetermined geometry. The cutting gap is typically used for separating workpiece parts from the (remaining) workpiece. An off-line determination of the focal position, e.g., by means of cuts/shots into reference sheets of metal, i.e., in the auxiliary process time such as that described in DE 102 55 628 A1, for example, is therefore typically no longer necessary for determining the focal position. The area on the top side (the side facing the processing head) of the workpiece to be monitored may include the cutting front, and/or the apex of the cutting front, behind which the cutting gap extends, but this is not absolutely necessary in determining the focal position. The processing beam may be a laser beam or some other type of high-energy beam, for example, a plasma beam. A laser beam is usually referenced in the following description, but it is self-evident that the processing beam may also be some other form of high-energy beam.

The term "spatially resolved image" in the sense of this patent application is also understood to refer to a (one-dimensional) image consisting of a row of pixels with 1×N pixels and is recorded by a 1×N pixel camera, for example, or optionally by diode array. To determine the gap width in this case, it is necessary for the line of pixels to be oriented at an angle to the direction of cutting and/or to the direction of the cutting gap because only in this way can the two cutting edges be detected. The line of pixels, i.e., the N pixels, are aligned at a right angle to the direction of cutting in order to include the cross section over the cutting gap. To be able to freely orient the cutting direction as well as to allow inclusion of the two cutting edges, the 1×N line of pixels is ideally arranged to be rotatable. It is self-evident that the number N of pixels is so great that the two cutting edges of the cutting gap can be detected when recording the image.

In one variant, the method additionally comprises: areal or structured illumination of the top side of the workpiece by directing at least one illuminating beam at least into the area of the top side of the workpiece to be monitored. To determine the gap width of the cutting gap at the top side of the workpiece, an areal illumination and/or a structured illumination may be used. The term "structured illumination" is understood to refer to illumination, in which at least one illuminating beam is directed at the top side of the workpiece by an illuminating device, which creates a pattern on the top side of the workpiece. To determine the gap width of the cutting gap, deviations and/or distortions in the pattern can be detected and analyzed in the recorded image. In this way it is possible in particular to determine height information on the basis of which the cutting edges of the cutting gap can be determined. A structured illumination in the form of a linear illumination, for example, also allows a determination of the gap width of the cutting gap for the case when incident radii are present at the cut edges. In the case of areal illumination, the top side of the workpiece is illuminated without drawing any inferences regarding the properties of the surface on the basis of a pattern created on the surface by the illuminating beam.

In a refinement of the invention, the illuminating beam is directed coaxially with the processing beam at the top side and/or at the surface of the workpiece facing the processing beam. This refinement is suitable in particular for areal illumination of the top side of the workpiece. DE 10 2011 003 717 A1 discloses a method of determining the gap width of a cutting gap, in which the cut edges of the cutting gap are determined as material borders of a workpiece illuminated with areal illumination. The cut edges here can be detected by edge finding in a gray scale image of the area of the workpiece to be monitored.

In another refinement, the structured illumination comprises directing at least one linear illuminating beam at the top side of the workpiece, wherein the linear illuminating beam typically runs transversely to the cutting gap. The projection of a pattern in the form of a line onto the top side of the workpiece is the simplest form of structured illumination. In this case the cutting edges are determined on the basis of the ends of the line projected onto the top side of the workpiece and/or on the basis of kinks in the line projected onto the top side of the workpiece (light section method).

In one variant, the method further comprises: determining a minimal gap width of the cutting gap in the thickness direction of the workpiece and determining the focal position of the processing beam relative to the workpiece on the basis of the gap width on the top side of the workpiece and on the basis of the minimal gap width. Determination of the focal position on the basis of the gap width on the top side of the workpiece is in general sufficient for determining the focal position but can be made more robust and less dependent on the laser beam parameters through the additional determination of the minimal gap width. This makes use of the fact that the narrowest cutting gap width is determined and/or influenced by the diameter of the beam waist, i.e., the diameter of the laser beam at the focal position. Both the cutting gap width at the top side of the workpiece and the minimal cutting gap width are determined and/or influenced by the caustic characteristics of the laser beam so that two supporting points of the caustic characteristics of the beam can be determined in the Z direction by the method described above. The measurement accuracy in determination of the focal position of the laser beam in Z direction can be greatly improved and/or another parameter of the caustic characteristics of the laser beam can be determined if the caustic characteristics of the laser beam, i.e., the diameter of the laser beam across the beam axis and/or the direction of propagation of the beam is known for example, on the basis of previous experiments on a plurality of positions in the direction of propagation of the beam.

In one variant, the minimal gap width of the cutting gap is determined on the basis of process emissions and/or process luminescence in the area to be monitored. The process emissions may be thermal radiation or line radiation from the cutting front, from the melt thread or metal vapor within and below the cutting gap. The width of the process emissions observed in the recorded image is limited by the cutting gap, more specifically by its minimal cutting gap width. Line radiation is understood to refer to radiation at typically discrete emission wavelengths, which are characteristic of a respective chemical element of the workpiece material. Laser radiation reflected by a surface beneath the cutting gap, or illumination from beneath, e.g., due to heated supporting webs, is suitable for making the narrowest cutting gap width measurable. The reflected laser radiation and/or the illumination due to heated supporting webs is/are regarded as process emissions in the sense of the present patent application. As an alternative to process emissions, the minimal cutting gap width can also be rendered measurable, for example, by an illuminating device provided specifically for this purpose, illuminating the workpiece from beneath at least in the area of the cutting gap.

In one refinement, at least one image of the area to be monitored is recorded at wavelengths in the infrared wavelength range. The infrared wavelength range is understood in the sense of the present patent application to refer to wavelengths between approx. 750 nm and approx. 1600 nm, in particular wavelengths between approx. 750 nm and approx. 1100 nm. The process emissions described further above and thus the minimal cutting gap width in particular can be detected quite well in this wavelength range. The gap width of the cutting gap at the top side of the workpiece can also be determined in the infrared wavelength range.

Alternatively or in addition to recording an image at wavelengths in the infrared wavelength range, a recording of at least one image may also be made in the visible wavelength range, i.e., at wavelengths between approx. 380 nm and approx. 750 nm or in the UV wavelength range, i.e., at wavelengths of less than approx. 380 nm. In particular in determining the gap width at the top side of the workpiece with the help of a light section, it may be advantageous to determine the cutting edges on the top side of the workpiece in a spatially resolved image in the visible wavelength range. The recording of the image(s) is/are preferably made with the help of a spatially resolved camera which is sensitive in the corresponding wavelength range. If necessary, wavelength filters may be used to select a suitable wavelength range from the spectrum of radiation striking the camera.

The at least one image of the area to be monitored is preferably recorded coaxially with a beam axis of the processing beam. Since the processing beam typically strikes perpendicularly the surface of the workpiece, which is usually flat, it is possible to achieve an observation that is independent of direction due to the coaxial observation of the area to be monitored. This has proven advantageous in determining the gap width at the top side of the workpiece and for determining the minimal gap width of the cutting gap.

In another variant, the gap width at the top side of the workpiece and the minimal gap width are determined on one and the same recorded image. In recording an image with the help of a coaxial camera and areal illumination of the area to be monitored, the difference between the two gap widths is typically visible as a "black border" in the recorded image extending on both sides along the cutting gap. This "black border" can be analyzed in a robust way using a suitable image processing method, so that it is possible to determine both the gap width at the top side and the minimal gap width.

In an alternative variant, the gap width at the top side of the workpiece and the minimal gap width are determined on at least two images, wherein at least one illuminating beam is directed at the top side of the workpiece in recording the second image, and wherein no illuminating beam is directed at the top side of the workpiece in recording the first image, and the pixels of the first image are preferably subtracted from the pixels of the second image. In this variant, the gap width at the top side of the workpiece and the minimal gap width can be determined separately in images that are alternately illuminated and not illuminated. In this case it is helpful to subtract the pixels of the "unilluminated" image from those of the "illuminated" image so that the cutting gap appears completely dark because in this way the process emissions are removed from the illuminated image. Again in this case, simple algorithms may be used for edge finding to determine the respective cutting gap widths.

The gap width is especially preferably determined on the top side of the workpiece, and the minimal gap width is especially preferably determined in at least three images, but an illuminated beam is not directed at the top side of the workpiece when recording the third image. In this case, it is helpful to subtract the pixels of the "unilluminated" first and third images from those of the "illuminated" second image pixel by pixel. To this end, the average of the "unilluminated" images are preferably subtracted from the pixels of the "illuminated" image pixel by pixel, or the pixels of the two "unilluminated" images are subtracted pixel by pixel from the pixels of the "illuminated" image multiplied by two.

Another aspect of the invention relates to a method for regulating a focal position of a processing beam relative to a workpiece in processing the workpiece by cutting using the processing beam, comprising: carrying out the method described above for determining a focal position of the processing beam relative to the workpiece as well as altering the focal position of the processing beam relative to the workpiece until the focal position corresponds to a target focal position. The target focal position may be offset by a predetermined value with respect to a reference focal position, for example, which is formed on the top side of the workpiece. If the beam waist is located on the surface or the top side of the workpiece, then the two positions are approximately the same size in the gap widths determined in the image(s). The focal position may therefore be used as the reference focal position, from which the desired target focal position is adjusted. The reference focal position thus constitutes an alternative to offline determination of the focal position, for example, by sections in reference sheet metal plates, such as those already described in DE 102 55 628 A1. In particular, this reference focal position can be determined easily for different laser powers and different zoom settings.

Another aspect of the invention relates to an apparatus for processing a workpiece by cutting by means of a processing beam, in particular by means of a laser beam, comprising an image acquisition device for recording at least one spatially resolved image of an area to be monitored on the top side of the workpiece, comprising the cut edges of a cutting gap formed in processing by cutting on the top side of the workpiece as well as an evaluation unit, which is designed and/or programmed to determine the gap width of the cutting gap on the top side of the workpiece on the basis of the cutting edges in the at least one image as well as to determine a focal position of the processing beam relative to the workpiece on the basis of the gap width thereby determined.

The apparatus may be designed as a processing head, for example, in particular as a laser processing head. In this case, the evaluation unit is typically integrated into the processing head. The apparatus may also be a processing machine, in particular a laser processing machine and/or a laser cutting machine. In this case, the evaluation unit is typically positioned at a spatially separate location from that of the processing head.

In one embodiment, the apparatus additionally comprises at least one illuminating device for areal and/or structured illumination of the top side of the workpiece by directing at least one illuminating beam at least into the area to be monitored. The illuminating device may be designed to direct the illuminating beam coaxially onto the top side of the workpiece in such a way that it is coaxial with the beam axis of the processing beam, but this is not absolutely necessary. In the so-called light section method in particular, a linear illuminating beam is typically directed obliquely, i.e., not coaxially with the processing beam, into the area at the top side of the workpiece to be monitored.

In another embodiment, the evaluation unit is designed to determine a minimal gap width of the cutting gap in the thickness direction of the workpiece as well as to determine the focal position of the processing beam relative to the workpiece on the basis of the gap width at the top side of the workpiece and on the basis of the minimal gap width. As also explained further above, two supporting points of the caustic characteristics of the beam can be determined in this way, thereby increasing the measurement accuracy in determination of the focal position.

In another embodiment, the apparatus additionally comprises a control device for altering the focal position of the processing beam relative to the workpiece until the focal position corresponds to a target focal position. For the focus regulation, the regulating device may access the (instantaneous) focal position or actual focal position determined with the help of the evaluation unit in order to shift the focal position to the target focal position by acting on a suitable control element.

Additional advantages of the invention are derived from the description and the drawings. Likewise, the features described above and those to be explained further below may be used independently or several combined in any combinations. The embodiments illustrated and described here are not to be understood as an exclusive list but instead are more in the nature of examples to describe the invention.

DESCRIPTION OF DRAWINGS

FIG. 3 shows a schematic diagram of an area on the top side of the workpiece to be monitored with a line directed at the top side of the workpiece to determine the gap width at the top side of the workpiece, FIG. 4 shows a schematic diagram of an area to be monitored on the top side of the workpiece, where both the minimal gap width and the gap width of the cutting gap at the top side of the workpiece can be determined, FIG. 5 shows a diagram of an illuminated image of the top side of the workpiece recorded on the laser processing machine, as illustrated in FIG. 1, corresponding to the schematic diagram shown in FIG. 4, and FIG. 6 shows a diagram of an unilluminated image of the top side of the workpiece corresponding to that in FIG. 5.

DETAILED DESCRIPTION

Figure 1:
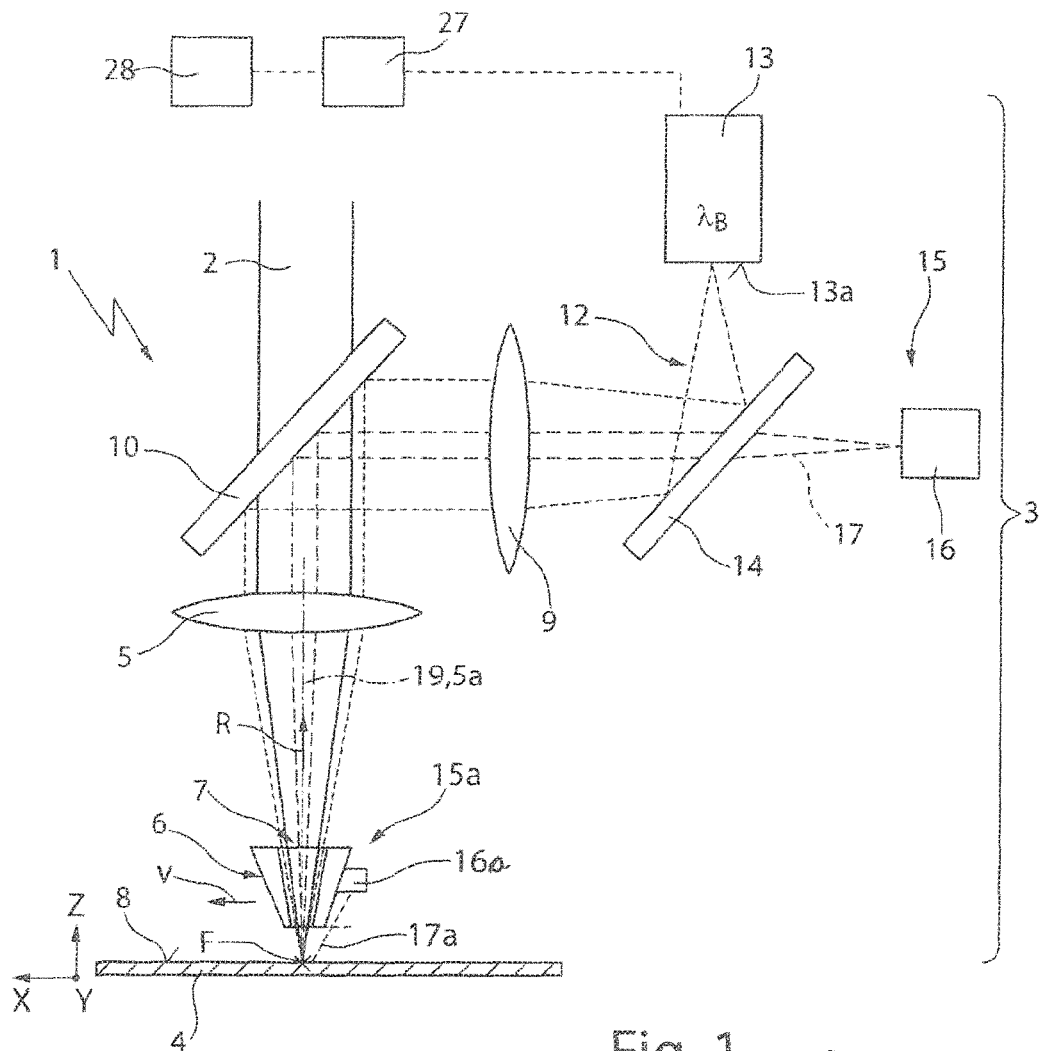
FIG. 1 shows a schematic diagram of one embodiment of a laser processing machine designed for determining the gap width of a cutting gap.

In the following description of the drawings, identical reference numerals are used for the same components and/or components having the same function.

FIG. 1 shows an example of the design of an apparatus in the form of a laser processing machine 1, comprising a processing head 3 for focusing a laser beam 2 on a plate-type workpiece 4 (metal plate) spaced a distance away from the processing head 3. The laser beam 2 in the example shown here is generated by a CO2 laser. Alternatively, the laser beam 2 may be generated by a solid-state laser. The laser beam 2 is focused on the workpiece 4 by means of a focusing device in the form of a focusing lens 5 in a laser cutting process in the example shown here.

The processing head 3 additionally comprises a processing nozzle 6, wherein the focusing lens 5 in the example shown here focuses the laser beam 2 through the processing nozzle 6, or more specifically, through an orifice 7 on the inside of the processing nozzle 6, on the workpiece 4, namely on a workpiece surface, which is formed on the top side 8 of the workpiece 4 and which the laser beam 2 strikes at a focusing position F in the example shown here.

FIG. 1 also shows a partially transparent mirror 10, through which the laser beam 2 guided by a beam guide passes and strikes the focusing lens 5. Observation radiation (for example, in the visible or infrared wavelength range) of an observation beam path 12, shown with a broken line in FIG. 1, is deflected on the partially transparent mirror 10 and passes through an additional lens 9 as well as an additional partially transparent mirror 14 to strike an image acquisition device 13 in the form of a camera. The image acquisition device 13 may be a high-resolution camera, which may be designed in particular as a high-speed camera. In the example shown here, images are recorded by the image acquisition device 13 in the NIR wavelength range, i.e., at wavelengths in the range between approx. 750 nm and approx. 1600 nm, in particular of wavelengths between approx. 750 nm and approx. 1100 nm. It is also possible to record images in the VIS or UV range. In the example shown in FIG. 1, a filter may be placed in front of the image acquisition device 13, if additional radiation and/or wavelength components are to be excluded from detection by the image detecting device 13. The filter may be designed as a narrow band pass filter, for example.

The additional lens 9 together with the focusing lens 5 serves as an imaging lens for imaging the workpiece surface 8 on a detector surface 13a of the camera 13. The imaging lens and/or the camera 13 are arranged in such a way that the observation beam path 12 runs coaxially with the beam axis 19 represented with a dash dot line in FIG. 1 and/or its extension. Since the beam axis 19 coincides with the main axis 5a of the focusing lens 5, the top side 8 of the workpiece is observed and/or the image of the workpiece surface is recorded in an observation direction R coaxially with the main axis 5a of the focusing lens 5 as well as coaxially with the longitudinal axis of the processing nozzle 6, which typically has rotational symmetry and is therefore independent of direction.

The processing head 3 additionally comprises a first illuminating device 15, which serves to illuminate the top side 8 of the workpiece 4 which is at a distance from the processing head 3. The first illuminating device 15 has a first illumination source 16, which generates a first illuminating beam 17 that is illustrated with broken lines in FIG. 1. In particular a diode laser, or optionally an LED, may be provided as the first illumination source 16 at a wavelength $\lambda B$ of 660 nm, 808 nm, 915 nm or 980 nm, for example. The first illuminating beam 17 passes through the additional partially transparent mirror 14 as well as the additional lens 9 and is reflected in the direction of the focusing lens 5 on the partially transparent mirror 10, such that the first illuminating beam 17 is aligned coaxially with the laser beam 2 and/or with the main axis 5a on the focusing lens 5 so that it passes through the opening 7 in the processing nozzle 6 and illuminates the surface 8 of the workpiece 4 areally.

FIG. 1 also shows a second illuminating device 15a having a second illumination source 16a, which may be designed, for example, as a diode laser or optionally as an LED, like the first illumination source 16 described above. The second illuminating device 15a is designed to generate a second, linear illuminating beam 17a, which is directed to the top side 8 of the workpiece 4 and forms a structured illumination of the workpiece 4.

Figures 2A, 2B:
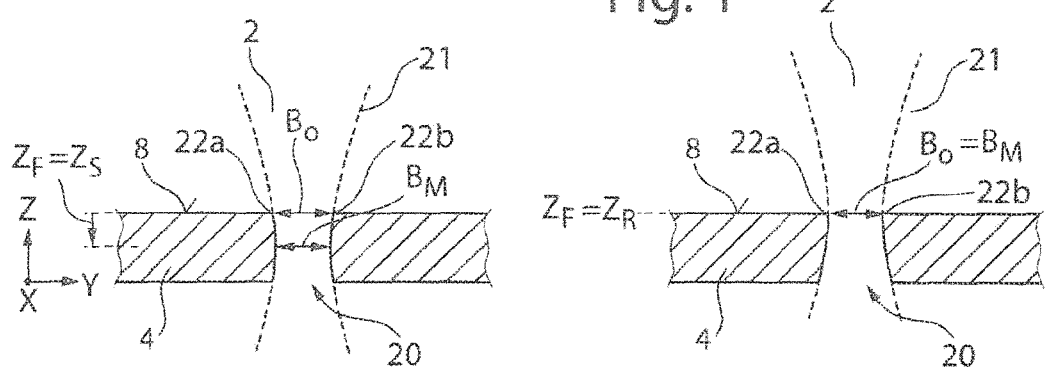
FIGS. 2A and 2B show diagrams of the caustic characteristics of the laser beam in two different focal positions of the laser beam relative to a plate-type workpiece.

In the example shown in FIG. 1, the processing head 3 is moved over the workpiece 4 along a feed direction v which corresponds to the positive X direction of an XYZ coordinate system. A cutting gap 20, which is illustrated in FIGS. 2A and 2B in a section through the workpiece in the YZ plane, i.e., across the feed direction v, is formed behind the focus F of the laser beam 2 in cutting processing. FIGS. 2A and 2B also show the laser beam 2, more specifically, the caustic characteristics 21 of the laser beam. The diagrams in FIG. 2A and FIG. 2B differ essentially through the different focal positions zF of the laser beam 2 in Z direction. Whereas the focal position zF in Z direction is situated beneath the top side 8 of the workpiece 4 in the example shown in FIG. 2A, the focal position zF in Z direction is located at the height of the top side 8 of the workpiece 4 in the example shown in FIG. 2B.

In the example shown in FIG. 2A, the focal position zF in Z direction is at a position in Z direction beneath the top side 8 of the workpiece 4 at which the cutting gap 20 has a minimal gap width BM. However, at the top side 8 of the workpiece 4, or more specifically, between the cutting edges 22a, b on the top side 8 of the workpiece 4, the cutting gap 20 has a larger cutting gap width BO.

FIG. 2B shows the special case, in which the focal position zF in Z direction is exactly on the top side 8 of the workpiece 4, so that the minimal gap width BM of the cutting gap 20 and the gap width BO at the top side 8 of the workpiece 4 are practically the same in size. The focal position zF shown in FIG. 2B can therefore be used as a reference position zR, starting from which the desired focal position zF in Z direction can be set relative to the workpiece 4.

If the caustic characteristics 21 of the laser beam 2 are known for example, because they were measured before the cutting processing of the workpiece 4, then the focal position zF in Z direction can be determined on the basis of the gap width BO at the top side 8 of the workpiece 4 if it is known whether the focal position zF is located above or below the top side 8 of the workpiece 4, which is usually the case in a cutting processing operation.

In the example shown in FIG. 3, an image 23 of a circular area 24 to be monitored on the top side 8 of the workpiece 4 recorded with the help of the camera 13 is shown, this image having been recorded through the nozzle opening 7 of the processing nozzle 6. In the image 23 recorded, the cutting gap 20 can be seen with the two cutting edges 22a, b. The linear illuminating beam 17a which is directed from the second illuminating device 16a to the top side 8 of the workpiece 4 in the Y direction, i.e., across the direction of the cutting gap 20 and/or the feed direction v can also be seen in the image 23. The linear illuminating beam 17a has a discontinuity at the two cutting edges 22a, b of the cutting gap 20 so that on the basis of the image 23 shown in FIG. 3 the gap width BO on the top side 8 of the workpiece 4 can be determined. Use of the linear illuminating beam 17a for structured illumination of the top side 8 of the workpiece 4 is favorable in particular if the cutting edges 22a, b in the image 23 cannot be identified well for example, because they are shown in gray scales. The image 23 of the top side 8 of the workpiece 4 shown in FIG. 3 can be recorded at wavelengths in the visible wavelength range, although this is not necessarily the case.

However, the image 23 of the area 24 to be monitored on the top side 8 of the workpiece 4, which is shown schematically in FIG. 4 and actually recorded in FIG. 5, was recorded with the help of a camera 13 at wavelengths λB in the infrared wavelength range, namely with the help of the first illuminating beam 17 in the case of areal illumination of the cutting gap 20. The cutting edges 22a, b of the cutting gap 20 can also be seen in the image 23, which was also recorded with the help of a camera 13. FIG. 5 also shows a black border 25, the contour of which is shown with broken lines in FIG. 4 and which has two side edges 25a, b running parallel to the cutting edges 22a, b. The edge 25 and/or its contour line shown with a broken line in FIG. 4 form the geometric border of process emissions 26, which occur in processing by cutting of the workpiece 4 and are shown as bright in FIG. 5. The distance between the two side edges 25a, b of the border 25 of the process emissions 26 corresponds to the minimal cutting gap width BM because the process emissions 26, which may be thermal radiation and/or linear radiation, for example, caused by the cutting front, the melt thread or metal vapor within and beneath the cutting gap 20, are bordered by the cutting gap 20. On the basis of the image 23 shown in FIG. 4 and/or FIG. 5, therefore the gap width BO at the top side 8 of the workpiece and the minimal gap width BM can be determined on one and the same image 23. As can be seen in FIG. 2A, the minimal gap width BM corresponds to the diameter of the beam waist of the laser beam 2, i.e., the minimal gap width BM supplies another supporting point of the caustic characteristics 21 of the laser beam 2 so that the measurement accuracy can be improved in determination of the focal position zF of the laser beam 2 in Z direction. If necessary, an additional parameter of the caustic characteristics 21 of the laser beam can also be determined through this additional information.

As an alternative to the simultaneous measurement of the gap width BO at the top side 8 of the workpiece 4 shown in FIG. 4 and in FIG. 5, as well as the minimal gap width BM on the basis of the black border 25, which can be seen well in FIG. 5, the two gap widths BO, BM can also be determined in two or more different images 23. For example, the gap width BO at the top side 8 of the workpiece 4 can be determined on the basis of the image 23 shown in FIG. 3 with the help of the linear illuminating beam 17a, whereas the minimal gap width BM¬ is determined on the basis of the image 23 shown in FIG. 4 and in FIG. 5.

In addition to the image 23 shown in FIG. 3, in which the top side 8 of the workpiece 4 is illuminated areally with the first illuminating beam 17, another image 23 may optionally also be recorded without an illuminating beam 17, as shown in FIG. 6. The two gap widths BM, BO can be determined on the basis of alternately illuminated and unilluminated images 23 in this way. In this case the unilluminated image shown in FIG. 6 can be subtracted on a pixel by pixel basis from an image 23, which is illuminated areally for example, as shown in FIG. 5, so that the cutting gap 20 appears completely dark in the resulting image since the process emissions have been removed from the illuminated image 23. Simple algorithms for edge finding can be used in the resulting image 23, which corresponds to the image 23 shown in FIG. 3 without the linear illuminating beam 17a.

In particular it is also possible to determine the two gap widths BM, BO on the basis of three alternately illuminated and unilluminated images 23. For example, a first unilluminated image 23 and a third unilluminated image 23 (corresponding to FIG. 6) as well as a second illuminated image 23 (corresponding to FIG. 5) may be used in this case. It is advantageous in this case if the pixels of the "unilluminated" first and third images 23 are subtracted from the "illuminated" second image 23. To this end, for example, the average of the "unilluminated" images 23 can be subtracted from those of the "illuminated" image 23 pixel by pixel, or the two "unilluminated" images can be subtracted from two times the "illuminated" image 23, pixel by pixel.

The image(s) 23 for determining the focal position zF in Z direction is/are analyzed in an evaluation unit 27 of the laser processing machine 1, as illustrated in FIG. 1. The evaluation unit 27 has a signal connection to a regulating device 28, and causes the focal position zF to be shifted to a target position zS (cf. FIG. 2A) by acting on a suitable control element, which results in a change in the distance between the processing head 3 and the workpiece 4, for example. This target position is located at a predetermined distance from the reference focal position zR on the top side 8 of the workpiece 4.

What is claimed is:

1. A method of regulating a focal position of a processing beam relative to a workpiece during cutting of the workpiece with the processing beam, wherein the cutting forms a cutting gap, the method comprising:
    illuminating an area of the workpiece with a first illuminating beam from a first illumination source and with a second illuminating beam from a second illumination source, wherein the first illuminating beam is aligned coaxially with the processing beam, and the second illuminating beam is directed across a direction of the cutting gap;
    recording at least one spatially resolved image of an area of the workpiece that is to be monitored, wherein the at least one image shows cut edges of said cutting gap formed on a top side of the workpiece during the cutting;
    determining, based on the cut edges in the at least one spatially resolved image, a top gap width of said cutting gap on the top side of the workpiece;
    measuring a minimal gap width of said cutting gap in the thickness direction of the workpiece, wherein the minimal gap width defines a minimal value of a gap width of said cutting gap in the thickness direction of the workpiece;
    determining the focal position of the processing beam relative to the workpiece, based on
        (i) the top gap width of said cutting gap on the top side of the workpiece,
        (ii) the minimal gap width of said same cutting gap as in (i), and
        (iii) a beam caustic of the processing beam; and
    changing the focal position of the processing beam relative to the workpiece until the focal position matches a target focal position;
    wherein the gap width of said cutting gap varies in the thickness direction of the workpiece; and
    wherein determining the top gap width on the top side of the workpiece and measuring the minimal gap width comprises:
        determining the respective gap widths from at least two images, wherein determining the respective gap widths comprises directing the first and second illuminating beams at the top side of the workpiece in recording the second image and directing no illuminating beam at the top side of the workpiece in recording the first image; and
        subtracting the first image from the second image pixel by pixel.

2. The method of claim 1, wherein the first illuminating beam provides areal illumination and the second illuminating beam provides structured illumination.

3. The method of claim 1, wherein measuring the minimal gap width comprises determining, based on process emissions from the cutting, the minimal gap width of said cutting gap.

4. The method of claim 1, wherein recording the at least one image of the area to be monitored comprises recording at wavelengths in the infrared wavelength range.

5. The method of claim 1, wherein recording the at least one image of the area to be monitored comprises recording the at least one image of the area coaxially with a beam axis of the processing beam.

6. The method of claim 1, wherein determining the top gap width on the top side of the workpiece and measuring the minimal gap width is performed on the at least one image.

7. The method of claim 1, wherein determining the top gap width on the top side of the workpiece and measuring the minimal gap width comprises determining the respective gap widths from at least three images, and wherein determining the respective gap widths comprises directing no illuminating beam at the top side of the workpiece when recording a third image.

8. The method of claim 1, wherein the first illumination source provides the first illuminating beam having a wavelength of 660 nm, 808 nm, 915 nm, or 980 nm.

* * * * *